No. 851,804. PATENTED APR. 30, 1907.
C. A. DRESSER.
CONTROLLER FOR ELECTRIC MOTORS.
APPLICATION FILED JUNE 19, 1902.

4 SHEETS—SHEET 2.

Witnesses.
Edward T. Wray.
Howard L. Kraft

Inventor.
Charles A. Dresser,
by Parker & Carter
Attorneys.

No. 851,804. PATENTED APR. 30, 1907.
C. A. DRESSER.
CONTROLLER FOR ELECTRIC MOTORS.
APPLICATION FILED JUNE 19, 1902.
4 SHEETS—SHEET 3.
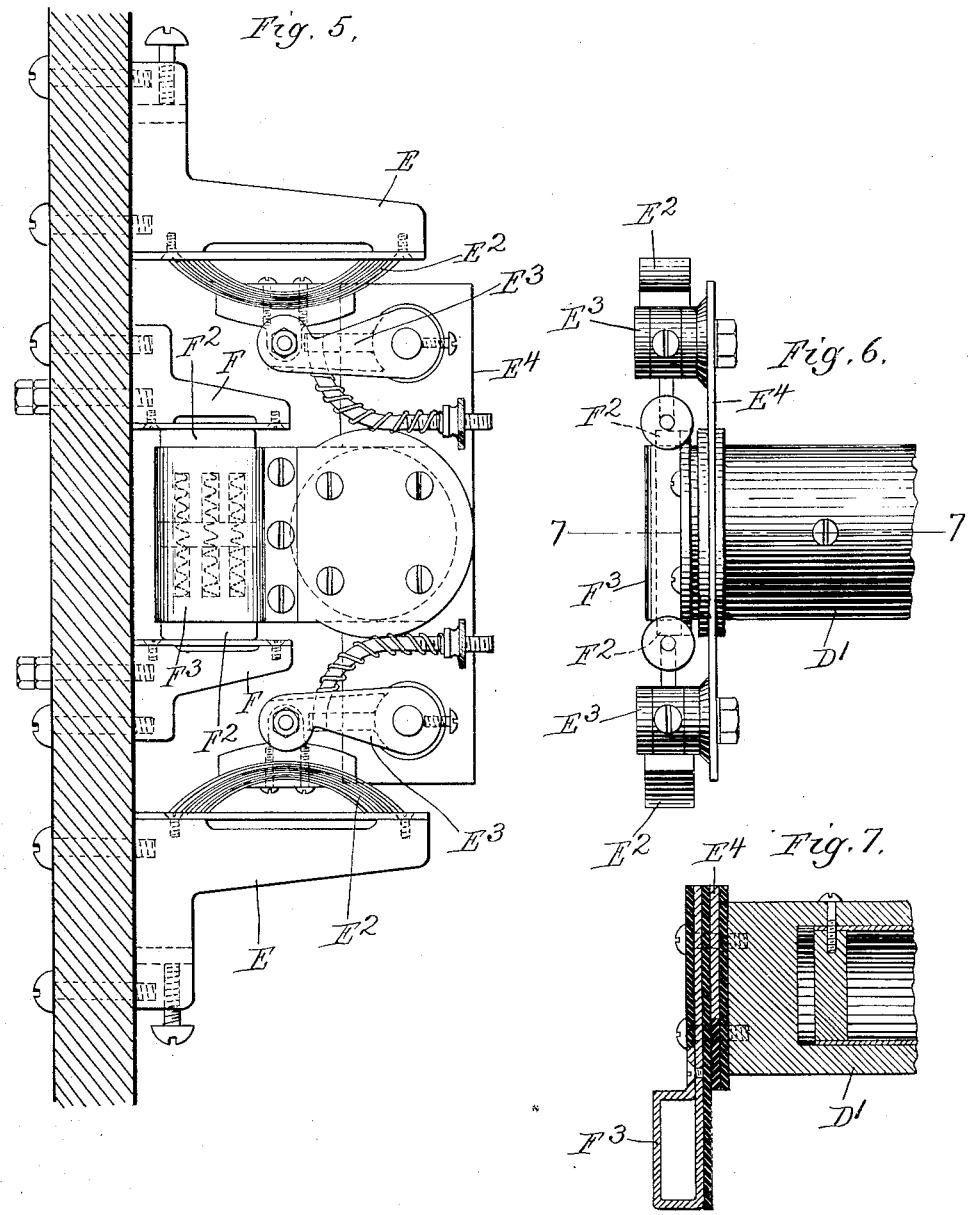

No. 851,804. PATENTED APR. 30, 1907.
C. A. DRESSER.
CONTROLLER FOR ELECTRIC MOTORS.
APPLICATION FILED JUNE 19, 1902.
4 SHEETS—SHEET 4.
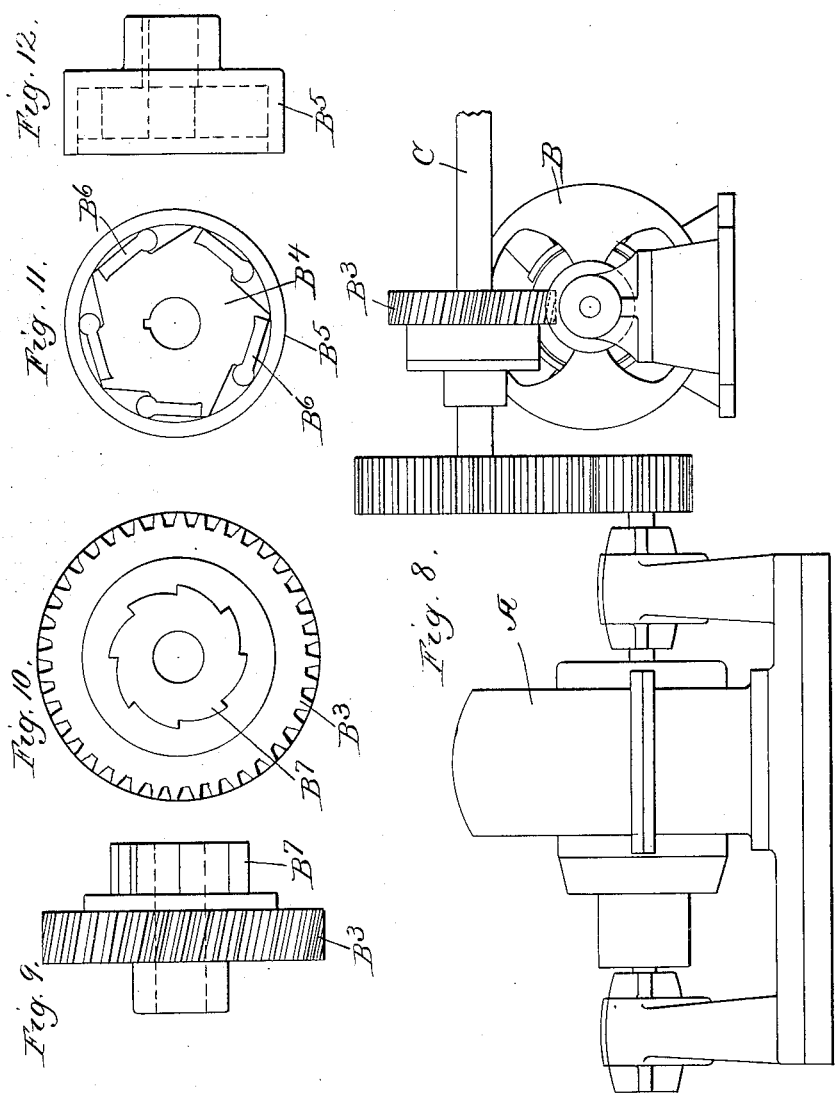
Witnesses.
Edward T. Nzay.
Homer L. Kraft.
Inventor.
Charles A. Dresser.
by Parker & Carter
Attorneys.

UNITED STATES PATENT OFFICE.

CHARLES A. DRESSER, OF CHICAGO, ILLINOIS, ASSIGNOR TO G. A. EDWARD KOHLER AND FRANKLIN W. KOHLER, OF CHICAGO, ILLINOIS.

CONTROLLER FOR ELECTRIC MOTORS.

No. 851,804.      Specification of Letters Patent.      Patented April 30, 1907.

Application filed June 19, 1902. Serial No. 112,334.

*To all whom it may concern:*

Be it known that I, CHARLES A. DRESSER, a citizen of the United States, residing at Chicago, in the county of Cook and State of Illinois, have invented a certain new and useful Improvement in Controllers for Electric Motors, of which the following is a specification.

My invention relates to controlling devices for electric motors and has for its object to provide a new and improved controlling device of this description.

My invention is illustrated in the accompanying drawings, wherein

Figure 1:
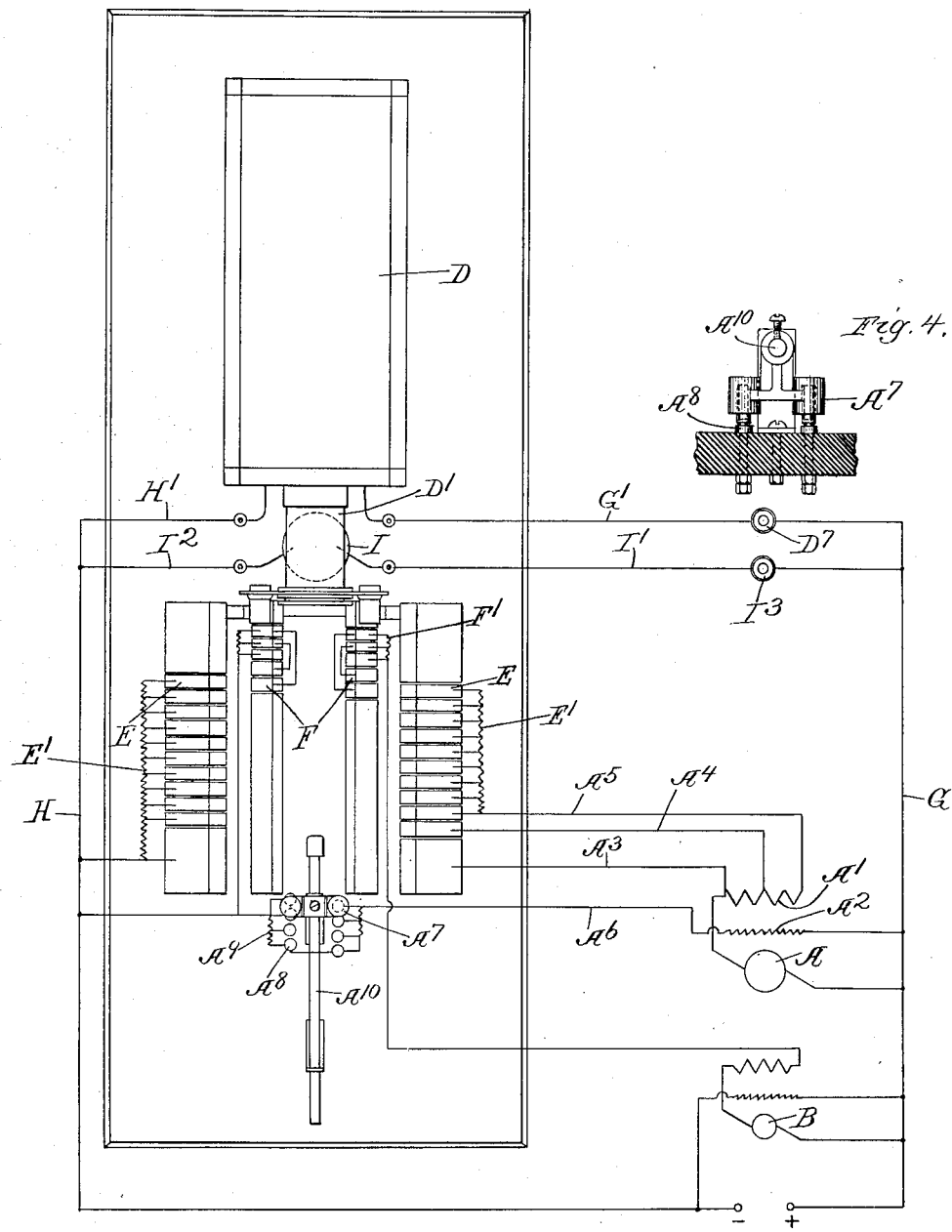
Figure 2:
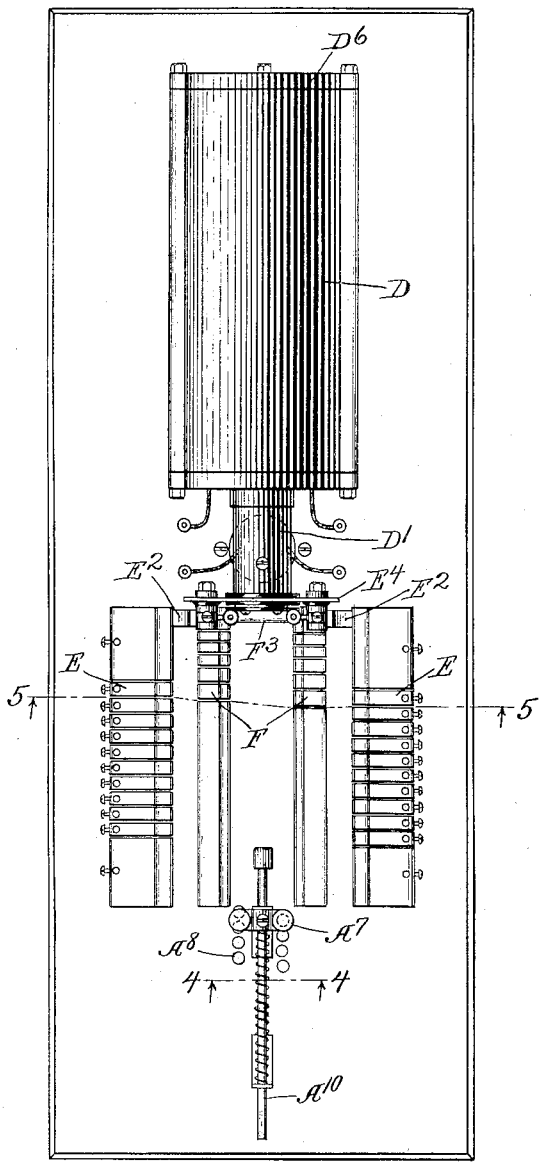
Figure 3:
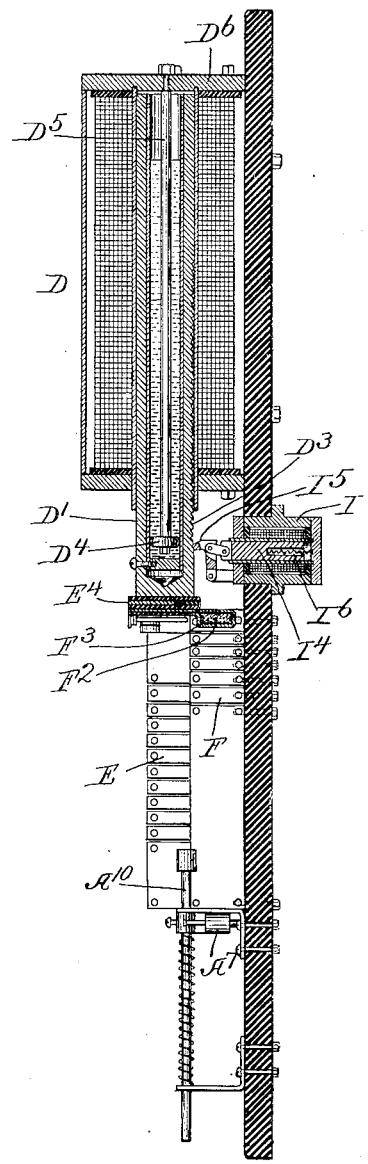

Figure 1 is a diagrammatic view of a controlling device embodying my invention; Fig. 2 is a front view of the controlling solenoid; Fig. 3 is a longitudinal section therethrough; Fig. 4 is a sectional view taken on line 4—4 Fig. 2; Fig. 5 is a section on line 5—5 Fig. 2; Fig. 6 is an enlarged front view of the brushes for the resistance controlled by the controlling solenoid; Fig. 7 is a sectional view taken on line 7—7 Fig. 6 with parts omitted; Fig. 8 is a view showing two motors connected to the driven shaft; Figs. 9, 10, 11 and 12 are detail views of the clutch mechanism.

Like letters refer to like parts throughout the several figures.

For purposes of illustration I have shown my invention adapted to be used in connection with several motors operating upon the same driven mechanism.

Referring now to the diagrammatic view of Fig. 1 I have shown two motors A and B and means for controlling them. It is of course evident that more than two motors can be used, but I have suggested two motors for purposes of illustration and in order to simplify the explanation of my invention. These two motors are illustrated in Fig. 8. The motor B is connected to the shaft C, which acts to drive the mechanism or apparatus in connection with which the motors are used, which apparatus may be of any desired nature, such, for example, as printing presses, and this construction is particularly adapted to be used with devices which are hard to start. The motor B is herein illustrated as a small motor and is connected to the shaft C by a suitable slow motion connection so that it will run at a higher speed than the shaft C. This connection may be of any suitable nature and is preferably arranged so that the small motor can readily start the shaft C and will quickly attain a comparatively high speed. After the shaft C is started and has set in motion the armature to motor A said motor is connected in circuit and takes the load. The motor B is preferably connected to the shaft C by a clutch mechanism which automatically disconnects it when the motor A is driving the shaft C.

Referring now to Fig. 1, I have illustrated a controlling solenoid D provided with a core $D^1$ to which are attached suitable brushes engaging the contacts E and F. Associated with the contacts E is the starting or controlling resistance $E^1$ for the motor A, the starting or controlling resistance $F^1$ for the motor B being associated with the contacts F. The motor A is preferably provided with a series field $A^1$ and a shunt field $A^2$. The series field $A^1$ is connected at three points by conductors $A^3$, $A^4$ and $A^5$ with some of the contacts E as shown. The shunt field $A^2$ is connected by a conductor $A^6$ with the brush $A^7$ associated with the contacts $A^8$ and resistance $A^9$, the said brushes being attached to the rod $A^{10}$. The solenoid D is connected to the mains G and H by conductors $G^1$ and $H^1$. Associated with the core $D^1$ of this solenoid is a suitable electrically controlled holding device adapted to hold the core in its extreme upper position and in any intermediate position. Any suitable device for this purpose may be used. In the drawings I have shown a magnet or solenoid I connected to the mains G and H by conductors $I^1$ $I^2$. In the circuit of this solenoid or magnet I is a switch $I^3$. The core $D^1$ of the solenoid D is provided with a series of teeth or projections $D^2$. The core $I^4$ of the magnet or solenoid I is provided with the engaging piece $I^5$ which engages said projections or teeth, and is held in engagement with said teeth by a suitable spring or the like $I^6$. The core $D^1$ is preferably provided with some means of controlling or retarding its motion. As herein shown said core is hollow and is provided with a piston $D^4$, connected to the rod $D^5$, fastened to the stationary part $D^6$. The hollow of the core is preferably filled with some fluid, and said core is arranged so that when released by the engaging devices $D^3$ it falls of its own weight, and this falling moves the brushes associated with the cores over the contacts F so as to cut out the resistance in the circuit of the motor B, and to then cut the resistance out of the circuit of the motor A.

Referring now to Fig. 5, I have shown an enlarged view of the brushes connected with the core $D^1$. The brushes $E^2$ are connected with suitable brush holders $E^3$, mounted upon the plate $E^4$, and there electrically pressed against the contacts E. The current passes through the brushes $E^2$ and the brush holders and the plate $E^4$ from one set of contacts to the other. The brushes $F^2$ are connected to a suitable holder $F^3$ and are pressed toward the contacts F by suitable springs as shown. The contacts F are arranged so that as the brushes begin to travel downwardly they cut resistance out of the motor circuit B until all such resistance is cut out, and then again to cut said resistance in the circuit until all the resistance is in circuit. The operation, therefore, of these brushes is to gradually bring the small motor up to speed and then cut in resistance so as to slow it down.

When the core $D^1$ approaches the limit of its downward movement it strikes the rod $A^{10}$ and moves it downwardly, carrying with it the brushes $A^7$, and these brushes passing over the contacts $A^8$ cut the resistance $A^9$ into the shunt field of the motor A. The circuit of the solenoid D is provided with a suitable switch $D^7$ by means of which the circuit can be controlled.

Figs. 9 to 12, inclusive, show an automatic clutch device. Connected with the worm $B^3$ is the ratchet $B^7$, loose on the shaft. A hollow casing $B^5$ keyed to the shaft fits over the ratchet $B^7$ and is provided with pivoted pawls $B^6$. When the slow motor is driving, one or more pawls $B^6$ engage the ratchet $B^7$, so that the shaft D is driven. When the high speed motor is in operation, the rotation of the casing $B^5$ throws the pawls $B^6$ outwardly by centrifugal force to the position shown in Fig. 11, thus automatically disconnecting the small motor from the shaft.

The use and operation of my invention are as follows: When the motors are at rest the core of the solenoid D is retracted and the brushes are at the upward limit of their movement. When it is desired to start up the device in connection with which the motors are used the switch $I^3$ is first moved so as to complete a circuit through the magnet I. Said magnet draws in its core, thus moving the engaging device $I^5$ so as to release the core $D^1$ of solenoid D. This core then drops and the brushes $F^2$ move along the contacts F and gradually cut the resistance $F^1$ out of the armature circuit of motor B. This motor then attains its speed very quickly because of the slow motion connection and drives the armature of motor A as well as the driving shaft for the mechanism to be operated. After the motor B has reached its speed the continued falling of the core of the solenoid brings the brushes $E^2$ against the contacts E and the resistance $E^1$ is gradually cut out of the armature circuit of motor A, thus causing said latter motor, the armature of which is already rotating, to at once speed up and take the load. When the shaft C attains a speed greater than that at which the motor B drives it the clutch acts and the motor B is automatically disconnected from such shaft. The brushes $F^2$ then cut in resistance in the armature circuit of motor B so as to slow it down and finally cut it out of circuit. As the motor attains its speed the dropping of the core of solenoid $D^1$ first cuts out a part of the series field $A^1$ and then the remainder of said series field, thus increasing the speed of the motor. Just before the core $D^1$ reaches the limit of its downward movement it strikes the rod $A^{10}$ and moves it downwardly, carrying with it the brushes $A^7$, which move along contacts $A^8$ and cut into the shunt field of motor A the resistance $A^9$, which further increases the speed of motor A. When the circuit is first completed through motor A it is as follows:— from main G through the armature, thence through the series field $A^1$, thence by conductor $A^5$ and through resistance $E^1$ to contacts E, thence across through brushes $E^2$ to the opposite contacts E and resistance $E^1$, and thence to the mains H. After the motor A has attained its maximum speed the series field is cut out and the current instead of passing along conductor $A^5$ passes along conductor $A^3$, the remaining part of the circuit being the same. If it is desired to stop the brushes and the core of solenoid $D^1$ in any intermediate position, this may be done by breaking the circuit by switch $I^3$. The engaging device $I^5$ then moves into engagement with the core $D^1$ and prevents further movement. It will be noted that with this construction the resistance is cut out of the motor circuit by the dropping of the core of solenoid D, and I have found that this arrangement prevents sparking at the contacts and hence injury thereto, for the brushes during the cutting out of the resistance can never reach a contact and then fall away from the contact so as to draw an arc. This will be evident from the fact that since the brushes overlap the contacts they will engage one contact before becoming separated from another, and after engaging a contact, they cannot be drawn backward so as to become disengaged therefrom, for if they could, this would result in injurious sparking. I have found in practice that this construction is an efficient remedy for sparking at the contacts of the controller.

When it is desired to stop the motors the switch $D^7$ is operated so as to complete the circuit through solenoid D. This energizes the solenoid and causes it to attract its core and thus move the brushes toward their initial position. As this core starts up it first moves the rod A¹⁰, which is upwardly pressed by its spring, so as to cut out the resistance in the shunt field of motor A, thus decreasing its speed. The series field of motor A is then gradually cut in so as to further decrease its speed and resistance is then cut into the armature circuit. After the speed of motor A is reduced sufficiently the motor B is connected in circuit and takes the load and this motor is then slowed down and finally stopped.

I prefer to form the contacts E of the two sides of the core or solenoid D¹ so that the brush strikes one contact before it leaves the opposite contact. This may be done by staggering the contacts. The contact F may be also staggered. The brushes are so arranged that they overlap the contacts. It will be seen that by this construction a heavy load may be started up without the use of an excessive current and that the driven apparatus will be under perfect control. Since the first motor may be made small and have a slow speed reduction gear connection to the load, it will readily start up and take very little current, and, since it starts the other motor to rotate, it will be seen that the other motor can readily take the load when the current is turned on, without the use of a large starting current.

It will further be seen that by this construction, during the process of cutting out resistance, there can be no retrograde movement of the parts so as to produce sparking. As herein shown, the prevention of a retrograde movement is due to the fact that the solenoid core falls during the process of cutting out resistance, but it is of course evident that other means to produce this result might be used.

I claim:

1. The combination with two or more electric motors of a controlling device therefor, comprising a series of resistance contacts for each motor, controlling resistances associated with said contacts the controlling resistance for the several motors located in different circuits, contact devices adapted to cut in or out said resistances, a support for said contact devices, and means for automatically moving said support so as to successively cut the resistance out of the motor circuits.

2. A controlling device for two or more motors, comprising two sets of controlling contacts and resistances associated together and located in separate circuits, a separate contact device for each set of contacts, both contact devices connected with the core of a solenoid whereby the motors are automatically controlled by a single solenoid.

3. A controlling device for two or more motors, comprising two sets of controlling contacts and resistances associated together, a separate contact device for each set of contacts, both contact devices connected with the core of a solenoid whereby the motors are automatically controlled by a single solenoid, and means independent of the coil of the solenoid for holding the core of said solenoid in any desired intermediate position.

4. A controlling device for electric motors comprising a series of resistance contacts to which is connected the resistance in circuit with the motor armature, a solenoid carrying a contact device coöperating with said contacts, and adapted when energized to move the contact device to a point where the resistance is in circuit, a device for stopping said contact device in an intermediate position during the process of cutting resistance out of the motor circuit so as to prevent a backward movement of the contact device when so stopped.

5. A controlling device for motors comprising a series of contacts to which are connected the starting resistances for the motor, a contact device coöperating with said contacts, a controlling device for said contact device adapted to be controlled from a distant point, means for stopping said contact device at certain predetermined intermediate positions during the process of cutting out resistance, the parts arranged so as to prevent said contact device from being stopped in such intermediate position during the process of cutting out resistance except when it is in proper position with relation to the opposed contacts.

6. A controlling device for motors, comprising a series of contacts with which are associated the starting resistances for the motor, a contact device adapted to be moved along said contacts, a solenoid having its core connected with said contact device, the parts arranged so that the resistance is cut out of the circuit of the motor by the dropping of the core and contact device under the influence of gravity.

7. A controlling device for an electric motor, comprising a suitable resistance, a series of contacts associated therewith, a contact device therefor adapted to be moved along the contacts to decrease the resistance in the motor circuit, an electrically actuated stop device controlled from a distant point for stopping said contact device at intermediate points, and arranged so as to be affected only when the contact device is in a nonsparking position.

8. A controlling device for electric motors, comprising a solenoid, a contact device carried by the core thereof, a series of contacts along which the contact device passes, a resistance associated with said contacts so that the movement of the contact device varies the resistance in the circuit, said solenoid arranged to move said contact device to insert resistance into the motor circuit said core adapted to be set in motion so as to move the contact device along the contacts to remove resistance from the circuit, a stop device to stop said core at an intermediate position while resistance is being removed, the parts arranged so as to prevent any retrograde movement of said contact device when stopped at an intermediate point during the process of decreasing the resistance in circuit.

9. A controlling device for a plurality of electric motors, comprising a controller proper for each motor, the several controllers separate from each other and adapted to be successively brought into action, and a starting means at a distant point for starting the operation of the controller and a separate controlling means at a distant point for stopping the action of the said controllers.

10. The combination with a driven device of two electric motors, a slow speed connecting mechanism between one of the motors and the driven device and a higher speed connecting mechanism between the other motor and the driven device, a controlling solenoid associated with said motors and means located at a distant point for successively starting said motors and transposing the load from one to the other, whereby a large starting current is prevented.

11. A controlling device for motors, comprising two sets of contacts separated from each other, a series of resistance coils associated therewith, a contact device adapted to be moved back and forth between said contacts, a second movable contact device located between a second series of contacts having resistances associated therewith, the several resistances being in different motor circuits, a support for both of said movable contact devices, and a single solenoid having a core connected with said support.

12. A controlling device for an electric motor comprising a series of resistance contacts to which is connected the resistance in circuit, a solenoid carrying a contact device coöperating with said contacts, a device for stopping said contact devices in an intermediate position and arranged so as to act thereon only when the contact device is in a non-sparking position.

13. A motor controlling device comprising a series of contacts with resistance between them and adapted to be connected in the motor circuit, a contact device adapted to be moved along said contacts, an electro magnetic device connected with said contact device so as when energized to move it to cut resistance into the motor circuit, said contact device when released adapted to be moved by gravity to cut resistance out of the motor circuit.

14. A motor controlling device comprising a series of contacts with resistance between them and adapted to be connected in the motor circuit, a contact device adapted to be moved along said contacts, an electro magnetic device connected with said contact device so as when energized to move it to cut resistance into the motor circuit, said contact device when released adapted to be moved by gravity to cut resistance out of the motor circuit, and a stop device for stopping said contact device in an intermediate position during its movement to cut resistance out of the circuit whereby sparking at the contacts is obviated.

CHARLES A. DRESSER.

Witnesses:
FANNY B. FAY,
HOMER L. KRAFT.